United States Patent
Kim et al.

(10) Patent No.: US 7,596,973 B2
(45) Date of Patent: *Oct. 6, 2009

(54) STRUCTURE OF DRIVING UNIT IN DRUM TYPE WASHING MACHINE

(75) Inventors: Jae Kyum Kim, Kyongsangnam-do (KR); Ho Cheol Kwon, Kyongsangnam-do (KR); Jong A Park, Kyongsangnam-do (KR); Kang Mo Choi, Kyongsangnam-do (KR)

(73) Assignee: LG Electronics Inc., Seoul (KR)

( * ) Notice: Subject to any disclaimer, the term of this patent is extended or adjusted under 35 U.S.C. 154(b) by 334 days.

This patent is subject to a terminal disclaimer.

(21) Appl. No.: 10/942,968

(22) Filed: Sep. 17, 2004

(65) Prior Publication Data
US 2005/0028567 A1  Feb. 10, 2005

Related U.S. Application Data

(63) Continuation of application No. 10/231,314, filed on Aug. 30, 2002, which is a continuation of application No. 09/624,144, filed on Jul. 21, 2000, now Pat. No. 6,460,382.

(30) Foreign Application Priority Data

Oct. 18, 1999 (KR) ............................... 1999-45088
Oct. 18, 1999 (KR) ............................... 1999-45089

(51) Int. Cl.
*D06F 37/20* (2006.01)

(52) U.S. Cl. .................. 68/24; 68/58; 68/140; 68/142

(58) Field of Classification Search .............. 668/140, 668/24, 58, 142; 134/184, 198
See application file for complete search history.

(56) References Cited

U.S. PATENT DOCUMENTS 2,531,225 A  11/1950  Le Tourneau (Continued)

FOREIGN PATENT DOCUMENTS

CH  462765  12/1966

(Continued)

OTHER PUBLICATIONS

European Patent Specification 219,115 (Apr. 1987).

(Continued)

*Primary Examiner*—Frankie L Stinson
(74) *Attorney, Agent, or Firm*—Ked & Associates, LLP

(57) ABSTRACT

Structure of driving unit in a drum type washing machine including a tub mounted inside of a cabinet, a drum mounted inside of the tub, a shaft connected to the drum mounted inside of the tub for transmission of a driving force from a motor to the drum, a front bearing and a rear bearing mounted on an outer circumference of the shaft at opposite end portions thereof respectively, a bearing housing built in a central portion of a rear wall of the tub for supporting the front bearing, a rotor composing the motor together with the rotor, and coupled to the rear end portion of the shaft, a stator fixed to the tub rear wall inward of the rotor to compose the motor together with the rotor, a connector serration coupled to the outer circumference of the shaft in front of the rear bearing and fixed to the rotor, for transmission of a rotating power from the rotor to the shaft, and a bearing bracket fixed to the rear wall of the tub to cover an outside of the rotor and support the rear bearing, thereby reducing noise, repair and power loss, by improving a structure of a driving unit, improving a product reliability, by improving a washing capability, and improving a productivity by improving workability in fabrication of components of the driving unit.

52 Claims, 10 Drawing Sheets

U.S. PATENT DOCUMENTS

| | | | |
|---|---|---|---|
| 2,656,702 A * | 10/1953 | Chapin | 68/154 |
| 3,138,727 A | 6/1964 | Ellner | |
| 3,194,032 A | 7/1965 | Von Brimer | |
| 3,248,908 A | 5/1966 | Pope | |
| 3,333,443 A | 8/1967 | Chung et al. | |
| 3,604,222 A | 9/1971 | Wutherich et al. | |
| 3,840,764 A | 10/1974 | Burger | |
| 3,914,963 A | 10/1975 | Brimer | |
| 4,423,607 A | 1/1984 | Munini | |
| 4,446,706 A | 5/1984 | Hartwig | |
| 4,623,812 A | 11/1986 | Van de Griend | 310/268 |
| 4,686,399 A | 8/1987 | Imori et al. | |
| 4,701,653 A | 10/1987 | Merkle et al. | |
| 4,712,035 A | 12/1987 | Forbes et al. | 310/269 |
| 4,734,604 A | 3/1988 | Sontheimer et al. | |
| 4,853,571 A | 8/1989 | Smith et al. | |
| 4,998,052 A | 3/1991 | Erdman et al. | |
| 5,040,285 A | 8/1991 | Williams et al. | |
| 5,150,589 A * | 9/1992 | Williams et al. | 68/23.7 |
| 5,266,855 A | 11/1993 | Smith et al. | 310/90 |
| 5,329,791 A | 7/1994 | Cargnel et al. | |
| 5,353,613 A | 10/1994 | Smith et al. | |
| 5,463,883 A | 11/1995 | Pellerin et al. | |
| 5,489,811 A | 2/1996 | Kern et al. | |
| 5,497,040 A | 3/1996 | Sato | |
| 5,528,092 A * | 6/1996 | Ohta | 310/67 R |
| 5,586,455 A * | 12/1996 | Imai et al. | 68/12.02 |
| 5,659,216 A | 8/1997 | Bisantz | |
| 5,677,816 A | 10/1997 | Oh | |
| 5,737,944 A * | 4/1998 | Nishimura et al. | 68/23.7 |
| 5,778,703 A | 7/1998 | Imai et al. | |
| 5,809,809 A | 9/1998 | Neumann | 68/140 |
| 5,825,108 A | 10/1998 | De Filippis | |
| 5,862,686 A | 1/1999 | Skrippek | 68/140 |
| 5,874,796 A | 2/1999 | Petersen | |
| 5,894,746 A | 4/1999 | Skrippek | |
| 5,907,206 A | 5/1999 | Shiga et al. | |
| 5,966,379 A | 10/1999 | Phillips et al. | |
| 5,975,846 A | 11/1999 | Wistinghausen | |
| 5,996,379 A * | 12/1999 | Skrippek | 68/140 |
| 6,006,553 A * | 12/1999 | Lee et al. | 68/23.3 |
| 6,023,839 A * | 2/2000 | Kinoshita et al. | 29/598 |
| 6,049,930 A * | 4/2000 | Hisano et al. | 8/159 |
| 6,050,113 A | 4/2000 | Skrippek et al. | 68/140 |
| 6,131,422 A * | 10/2000 | Skrippek et al. | 68/140 |
| 6,148,647 A * | 11/2000 | Kabeya et al. | 68/140 |
| 6,257,027 B1 * | 7/2001 | Imai | 68/12.12 |
| 6,339,275 B1 | 1/2002 | Katagiri | 310/261 |
| 6,341,507 B1 * | 1/2002 | Rode et al. | 68/12.16 |
| 6,396,177 B1 * | 5/2002 | Shin et al. | 310/63 |
| 6,396,190 B1 | 5/2002 | Ahn et al. | |
| 6,626,014 B2 | 9/2003 | Heyder et al. | |
| 6,661,550 B2 * | 12/2003 | Konno et al. | 359/200 |
| 6,681,602 B2 | 1/2004 | Heyder et al. | |

FOREIGN PATENT DOCUMENTS

| | | |
|---|---|---|
| DE | 1907719 | 8/1970 |
| DE | 31 05 318 | 8/1982 |
| DE | 36 14 703 | 11/1986 |
| DE | 4335966 A1 | 4/1995 |
| DE | 36 34 214 | 4/1998 |
| DE | 19724475 A1 | 12/1999 |
| DE | 10058409 | 5/2002 |
| EP | 0 043 429 | 1/1982 |
| EP | 0 198 554 | 10/1986 |
| EP | 0219 115 | 4/1987 |
| EP | 0 354 158 | 2/1990 |
| EP | 0 361 775 | 4/1990 |
| EP | 0 374 519 | 6/1990 |
| EP | 0 620 308 | 10/1994 |
| EP | 0620308 A2 | 10/1994 |
| EP | 0 629 735 | 12/1994 |
| EP | 0657575 | 11/1995 |
| EP | 0 780 507 | 6/1997 |
| EP | 0789 103 | 8/1997 |
| EP | WO 98/36123 | 8/1998 |
| EP | 0953668 | 11/1999 |
| EP | 1094144 | 12/2003 |
| EP | 1548171 | 6/2005 |
| EP | 1619286 | 1/2006 |
| GB | 701511 | 12/1953 |
| GB | 2006836 | 5/1979 |
| GB | 2 030 896 | 4/1980 |
| GB | 2189511 | * 10/1987 |
| GB | 2202867 | * 10/1988 |
| GB | 2261881 | * 6/1993 |
| GB | 2272913 | 6/1994 |
| GB | 2322240 | 6/1998 |
| GB | 2 332 212 | 6/1999 |
| GB | 2 333 300 | 7/1999 |
| GB | 2333300 | * 7/1999 |
| JP | 58207834 | 12/1983 |
| JP | 59035548 | 2/1984 |
| JP | 60-5197 | 1/1985 |
| JP | 61-17877 | 2/1986 |
| JP | 61236350 | 10/1986 |
| JP | 2-14278 | 1/1990 |
| JP | 4033536 | 2/1992 |
| JP | 4317547 | 11/1992 |
| JP | 5-176488 | 7/1993 |
| JP | 5176488 | 7/1993 |
| JP | 7-68086 | * 3/1995 |
| JP | 8019229 | 1/1996 |
| JP | 7-259866 | 11/1996 |
| JP | 09-103596 | 4/1997 |
| JP | 9098547 | 4/1997 |
| JP | 10210727 | 8/1998 |
| JP | 11028298 | 2/1999 |
| JP | 11-89198 | 3/1999 |
| JP | 11-137884 | 5/1999 |
| JP | 11-207077 | 8/1999 |
| JP | 11-207086 | 8/1999 |
| JP | 11-239692 | 9/1999 |
| JP | 11-276777 | 10/1999 |
| JP | 11-285205 | 10/1999 |
| JP | 11-28287 | 11/2000 |
| JP | 2000-325693 | 11/2000 |
| JP | 2000-334194 | 12/2000 |
| KR | 10-1998-0058943 | 10/1998 |
| KR | 10-1999-0030909 | 5/1999 |
| KR | 2000-77232 | 12/2000 |
| KR | 1020000077232 | 12/2000 |
| WO | 95/17543 | 6/1995 |
| WO | WO 98/00902 | 1/1998 |
| WO | WO 98/56973 | 12/1998 |
| WO | WO 98/56974 | 12/1998 |
| WO | WO 98/59102 | 12/1998 |

OTHER PUBLICATIONS

European Search Report for EP 04 07 7356.

*Korean Decision / LG Electronics Inc. v. Daewoo Electronics, Ltd.* — Provisional Disposition to Inhibit Infringement, (Jun. 2007)— and English Language Translation.

Japanese Decision / LG Electronics Inc. — Appeal filed in regard to "Structure of Driving Unit in Drum Type Washing Machine", JP 2000-246072, (Apr. 2007) — and English Language Translation.

European Office Actions dated Oct. 28, 2008 (4).

Request for Reexamination of U.S. Patent No. 6,460,382 filed Nov. 14, 2008.

Corrected Request for Reexamination of U.S. Patent No. 6,460,382 filed Jan. 28, 2009.

Decision Granting Request for Reexamination of U.S. Patent No. 6,460,382 issued Feb. 26, 2009.

Request for Reexamination U.S. Appl. No. 90/009,349 of U.S. Patent No. 6,914,363 filed Dec. 5, 2008.

Corrected Request for Reexamination U.S. Appl. No. 90/009,349 of U.S. Patent No. 6,914,363 filed Feb. 9, 2009.

Decision Granting Request for Reexamination U.S. Appl. No. 90/009,349 of U.S. Patent No. 6,914,363 issued Apr. 27, 2009.

Defendants' Reply in Further Support of Motion to Stay Litigation in pending litigation against ASKO Appliance Inc. et al. on filed May 29, 2009.

Declaration in Support of Defendants' Reply in pending litigation against ASKO Appliance Inc. et al. filed on May 29, 2009.

Order Denying Defendants' Motion for Stay and Dismissing Plaintiff's Motion for Preliminary Injunction in pending litigation against ASKO Appliance Inc. et al. filed on Jun. 17, 2009.

* cited by examiner

STRUCTURE OF DRIVING UNIT IN DRUM TYPE WASHING MACHINE

This application is a continuation of U.S. application Ser. No. 10/231,314 filed Aug. 30, 2002, which is itself a continuation of U.S. application Ser. No. 09/624,144, which was filed Jul. 21, 2000, and which now has issued as U.S. Pat. No. 6,460,382 on Oct. 8, 2002.

BACKGROUND OF THE INVENTION

1. Field of the Invention

The present invention relates to a drum type washing machine, and more particularly, to a structure of a driving unit in a drum type washing machine.

2. Background of the Invention

In general, a drum type washing, making washing by using friction between a drum rotated by a motor and laundry in a state detergent, washing water, and the laundry are introduced into the drum, provides effects of beating and rubbing washing, but gives almost no damage to the laundry, and shows no entangling of the laundry. A structure of a related art drum washing machine will be explained with reference to FIG. 1. FIG. 1 illustrates a longitudinal section of a related art drum type washing machine, provided with a tub 2 mounted inside of a cabinet 1, a drum 3 rotatably mounted on a central portion of inside of the tub 2. There is a motor 5a under the tub 2 connected with a pulley 18. There is a drum shaft connected to a rear of the drum 3, to which a drum pulley 19 is coupled. And, the drum pulley 19 on the drum shaft and the motor pulley 18 connected to the motor 5a are connected by a belt 20 for transmission of power. And, there is a door 21 in a front part of the cabinet 1, with a gasket 22 between the door 21 and the tub 2. There is a hanging spring between an inside of an upper portion of the cabinet 1 and an outside of an upper portion of the tub 2, and a friction damper 24 between an inside of a lower portion of the cabinet 1 and a lower side of an outside of the tub 2 for damping vibration of the tub 2 generated during spinning.

However, the related art washing machine has the following disadvantages since driving power of the motor 5a is transmitted to the drum 3 through the motor pulley 18, and the drum pulley 19, and the belt 20 connecting the motor pulley 18 and the drum pulley 19.

First, there is a loss of energy in a course of driving power transmission because the driving power is transmitted from the motor 5a to the drum 3, not directly, but through the belt 20 wound around the motor pulley 18 and the drum pulley 19.

And, the driving power transmission from the motor 5a to the drum 3, not directly, but through many components, such as the belt 20, the motor pulley 18, and the drum pulley 19, causes much noise in the course of power transmission.

The lots of components required for transmission of driving power from the motor 5a to the drum 3, such as the motor pulley 18, the drum pulley 19 and the belt 20, require many assembly man-hours. And, the more the number of components required for transmission of driving power from the motor 5a to the drum 3, the more number of spots which require repair, and the more frequent at which repair required.

In summary, the indirect driving power transmission from the motor 5a to the drum 3 through the motor pulley, the drum pulley, and the belt requires many repair, has much noise, waste of energy, and results in a deterioration of a washing capability.

Moreover, the tub 2 of stainless steel in general in the related art drum washing machine is expensive, has a poor formability, and is heavy.

SUMMARY OF THE INVENTION

Accordingly, the present invention is directed to a structure of a driving unit in a drum type washing machine that substantially obviates one or more of the problems due to limitations and disadvantages of the related art.

An object of the present invention is to provide a structure of driving unit in a drum type washing machine, which can reduce noise, repair and waste of energy, and moreover, improve washing capability.

Another object of the present invention is to provide a structure of driving unit in a drum type washing machine, which has an improved supporting force.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the structure of a driving unit in a drum type washing machine having a tub mounted in a cabinet, a drum mounted in the tub, a shaft fixed to the drum for transmission of driving power from the motor to the drum, and bearings mounted on an outer circumference of the shaft at opposite end portions thereof, includes a metallic bearing housing at a central portion of a rear wall of the tub for supporting the bearings mounted on the outer circumferences of opposite end portions of the shaft.

In other aspect of the present invention, there is provided a structure of driving unit in a drum type washing machine including a tub mounted inside of a cabinet, a bearing housing built in a central portion of a rear wall of the tub for supporting a bearing therein, a shaft connected to a drum mounted inside of the tub for transmission of a driving force from a motor to the drum, bearings mounted on an outer circumference of the shaft at opposite end portions thereof respectively, a rotor coupled to a rear end of the shaft, a stator provided inward of the rotor fixed to the tub rear wall, a connector provided between the shaft and the rotor for transmission of a rotating force from the rotor to the shaft for rotating the shaft and the rotor together, and a supporter fitted between the rear wall of the tub and the stator for supporting the stator and maintaining a concentricity when the stator is mounted to the tub rear wall.

In another aspect of the present invention, there is provided a structure of driving unit in a drum type washing machine including a tub of plastic mounted inside of a cabinet, a metallic bearing housing inserted and built in a central portion of a rear wall of the tub having steps of "]" and "[" forms on an inner circumference for supporting bearings therein, a shaft connected to a drum mounted inside of the tub for transmission of a driving power from a motor to the drum, having a front end portion fixed to a spider in the drum rear wall, a brass bushing press fit on a region of the shaft from a portion exposed in rear of the spider to the front bearing for prevention of rusting of the shaft, and steps on an outer circumference thereof for fixing mounting positions of the front bearing and the rear bearing on the shaft, bearings mounted on the outer circumference of the shaft at opposite end portions thereof respectively, a rotor of steel or steel alloy plate coupled to the rear end portion of the shaft, including a bent portion formed along a circumference thereof having a setting surface for supporting magnets fitted to an inside of a front portion of a sidewall extended forward from a periphery of a rear wall, and a hub at a center of the rear wall having a through hole for a fastening member, such as a bolt, for coupling the rotor to the shaft, a plurality of cooling fins formed around the hub in a radial direction each with a length for blowing air toward the stator when the rotor is rotated for cooling down a heat generated at the stator, an embossing between adjacent cooling fins on the rear wall of the rotor for reinforcing the rotor, and a drain hole in each of the embossings, for drain of water, a stator composing the motor together with the rotor, fixed to the tub rear wall inward of the rotor, a connector of plastic provided between the shaft and the rotor for transmission of a rotating force from the rotor to the shaft for rotating the shaft and the rotor together, and a supporter fitted between the rear wall of the tub and the stator for supporting the stator and maintaining a concentricity when the stator is mounted to the tub rear wall.

In further aspect of the present invention, there is provided a structure of driving unit in a drum type washing machine including a tub mounted inside of a cabinet, a drum mounted inside of the tub, a shaft connected to the drum mounted inside of the tub for transmission of a driving force from a motor to the drum, a front bearing and a rear bearing mounted on an outer circumference of the shaft at opposite end portions thereof respectively, a bearing housing built in a central portion of a rear wall of the tub for supporting the front bearing, a rotor composing the motor together with the rotor, and coupled to the rear end portion of the shaft, a stator fixed to the tub rear wall inward of the rotor to compose the motor together with the rotor, a connector serration coupled to the outer circumference of the shaft in front of the rear bearing and fixed to the rotor, for transmission of a rotating power from the rotor to the shaft, and a bearing bracket fixed to the rear wall of the tub to cover an outside of the rotor and support the rear bearing.

In a still further aspect of the present invention, there is provided a structure of driving unit in a drum type washing machine including a tub of plastic mounted inside of a cabinet, a metallic bearing housing inserted to built in a central portion of a rear wall of the tub having steps on an inner circumference for supporting bearings therein, a shaft connected to a drum mounted inside of the tub for transmission of a driving power from a motor to the drum, having a front end portion fixed to a spider in the drum rear wall, and a brass bushing press fit on a region of the shaft from a portion exposed in rear of the spider to the front bearing for prevention of rusting of the shaft, bearings mounted on the outer circumference of the shaft at opposite end portions thereof respectively, a rotor of steel or steel alloy plate coupled to the rear end portion of the shaft, including a bent portion formed along a circumference thereof having a setting surface for supporting magnets fitted to an inside of a front portion of a sidewall extended forward from a periphery of a rear wall, and a hub at a center of the rear wall having a through hole for a fastening member, such as a bolt, for coupling the rotor to the shaft, a plurality of cooling fins formed around the hub in a radial direction each with a length for blowing air toward the stator when the rotor is rotated for cooling down a heat generated at the stator, an embossing between adjacent cooling fins on the rear wall of the rotor for reinforcing the rotor, and a drain hole in each of the embossings, for drain of water, a stator composing the motor together with the rotor, fixed to the tub rear wall inward of the rotor, a connector of plastic provided between the shaft and the rotor for transmission of a rotating force from the rotor to the shaft for rotating the shaft and the rotor together, a supporter fitted between the rear wall of the tub and the stator for supporting the stator and maintaining a concentricity when the stator is mounted to the tub rear wall, and a bearing bracket fixed to the rear wall of the tub to cover an outside of the rotor and support the rear bearing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
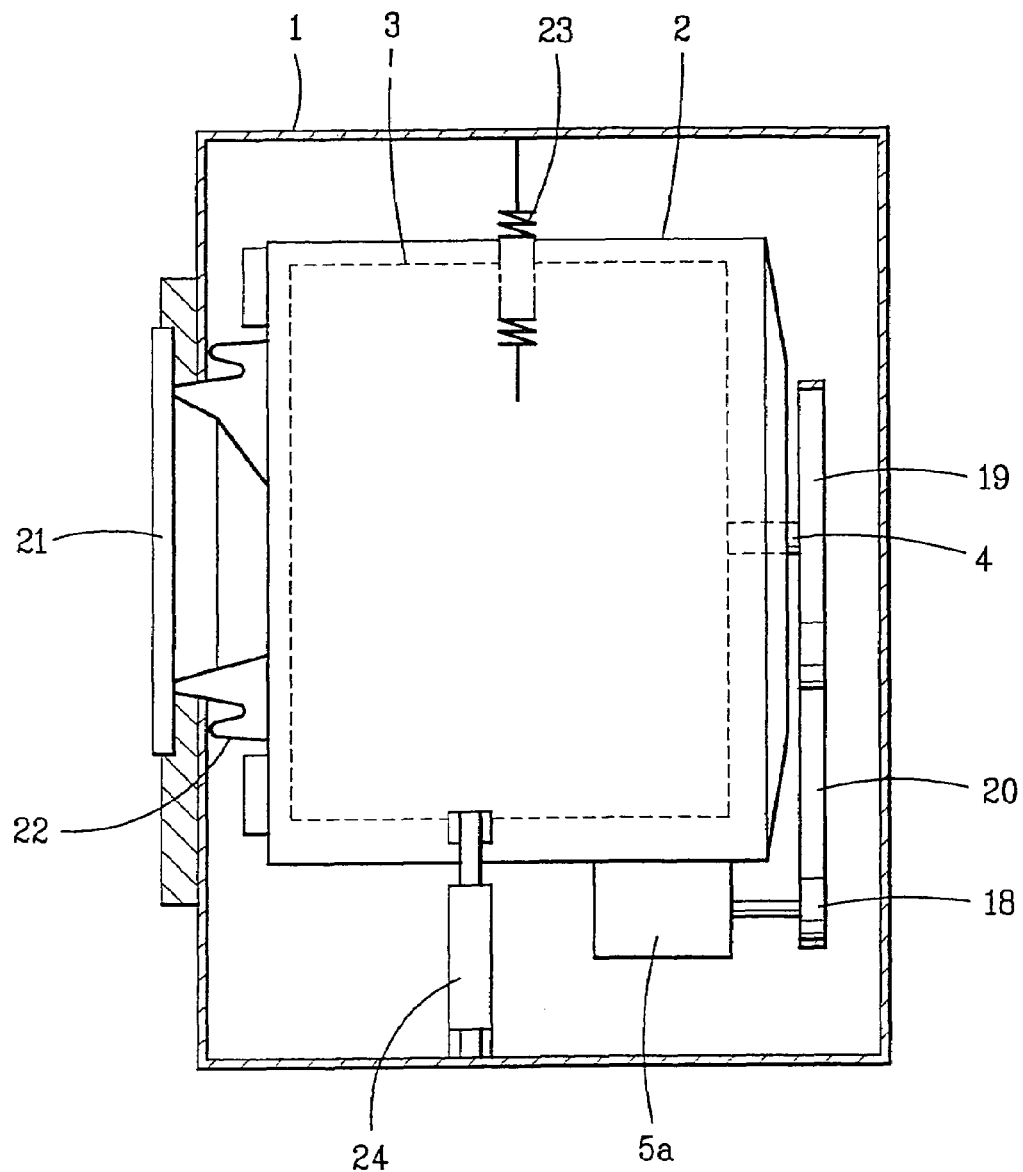
FIG. 1 illustrates a longitudinal section of a related art drum type washing machine.
Figure 2A:
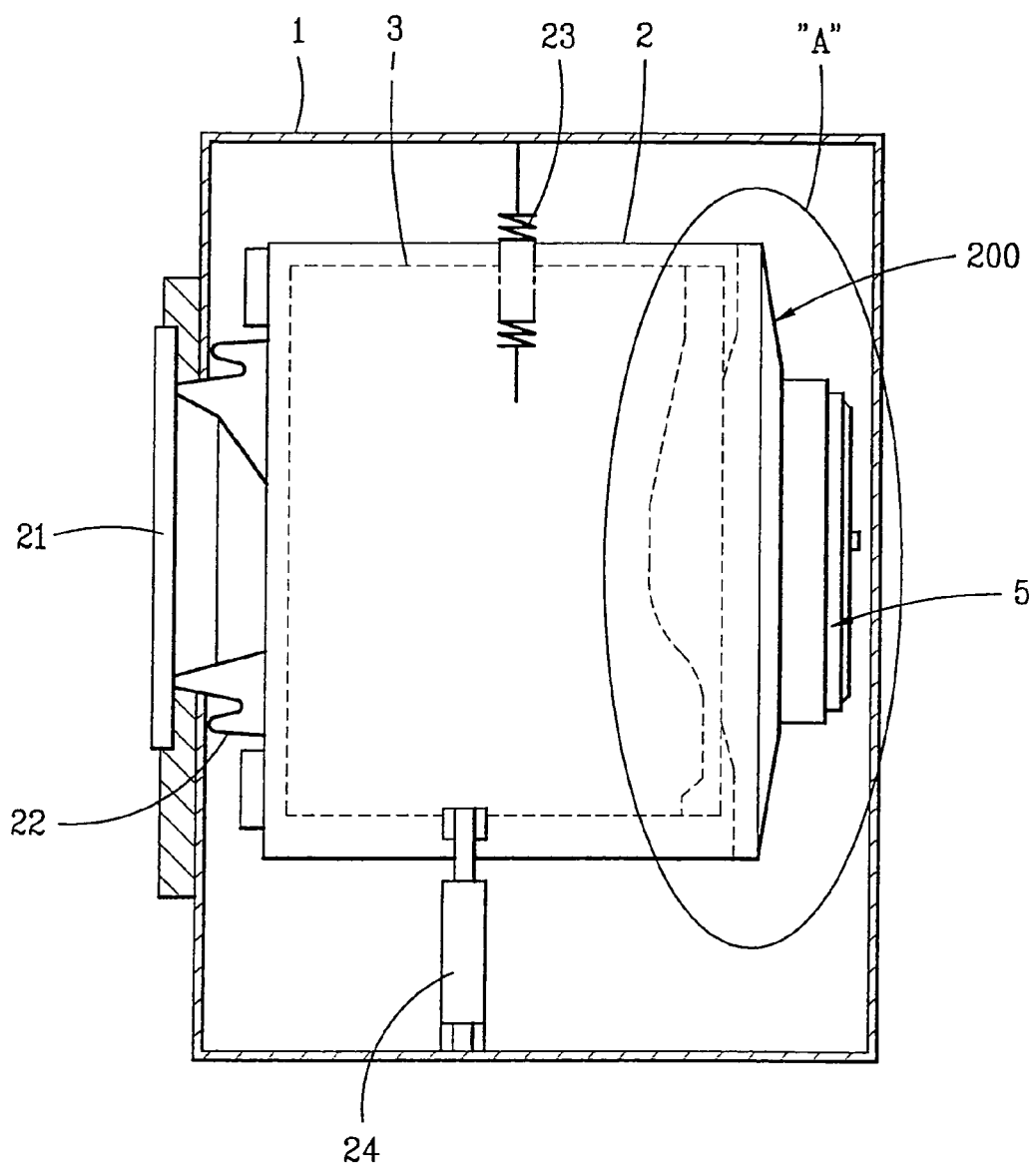
FIG. 2A illustrates a longitudinal section of a drum type washing machine in accordance with a first preferred embodiment of the present invention.
Figure 2B:
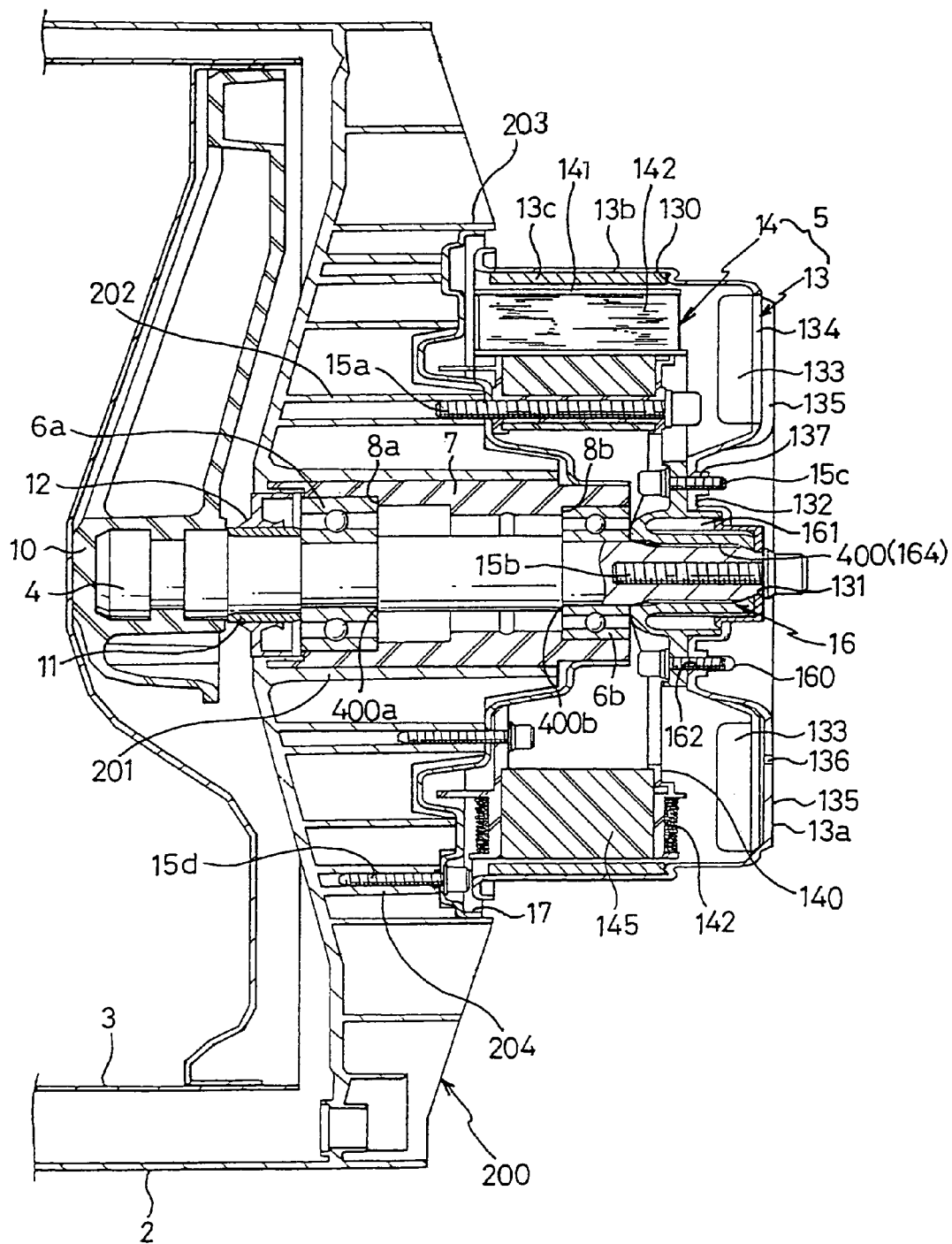
FIG. 2B illustrates a detailed enlarged view of "A" part in FIG. 2A.
Figure 6:
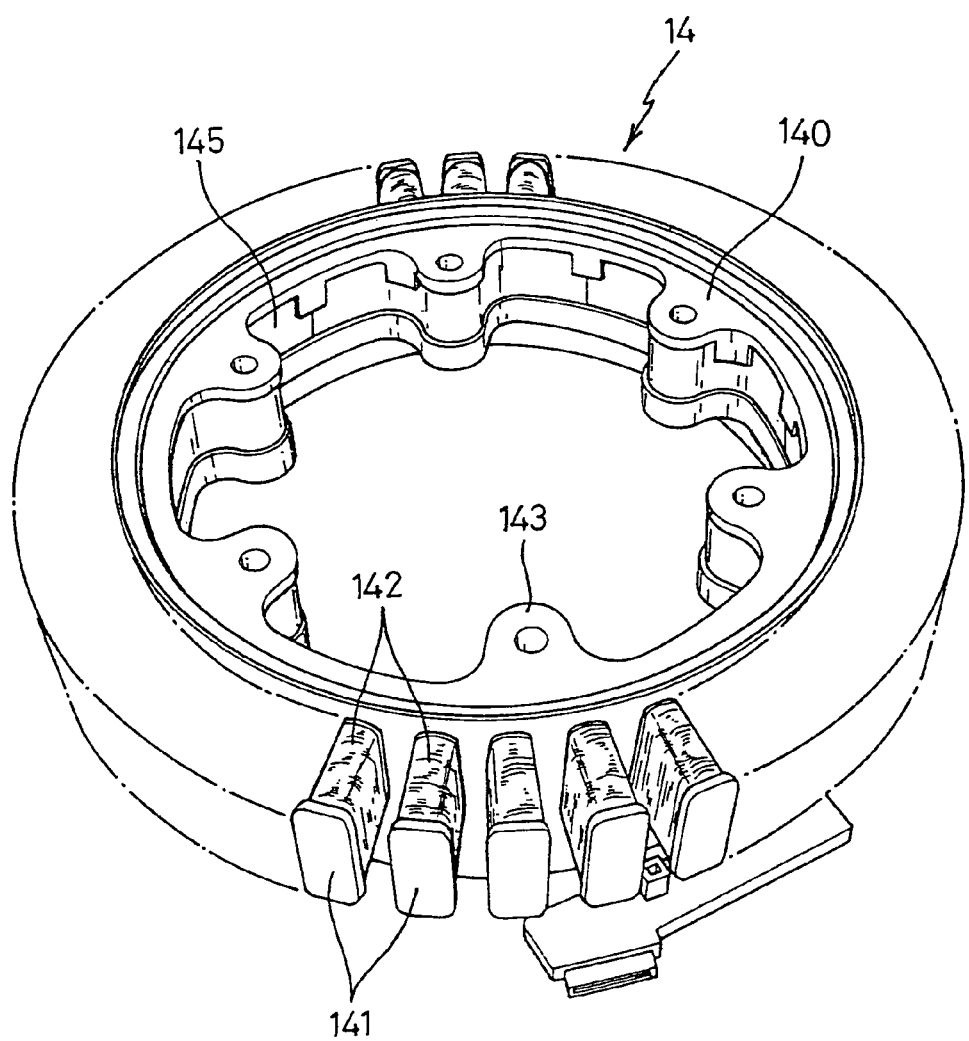
FIG. 6 illustrates a perspective view of the stator in FIG. 2.
Figure 7:
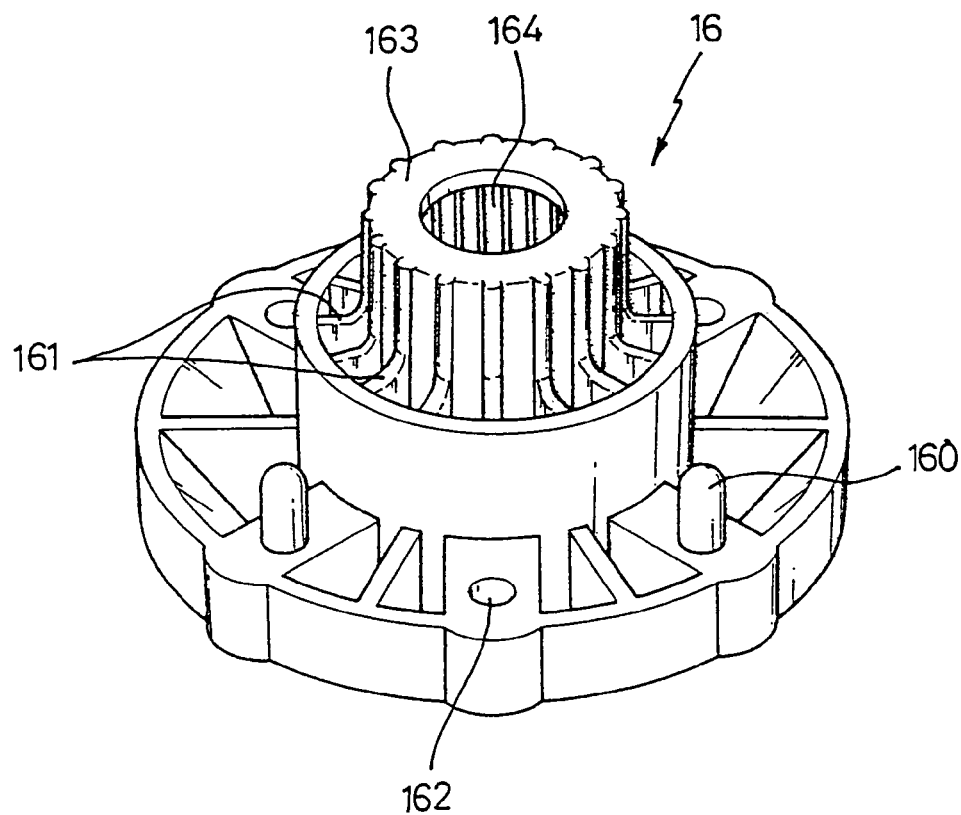
FIG. 7 illustrates a perspective view of the connector in FIG. 2.
Figure 8:
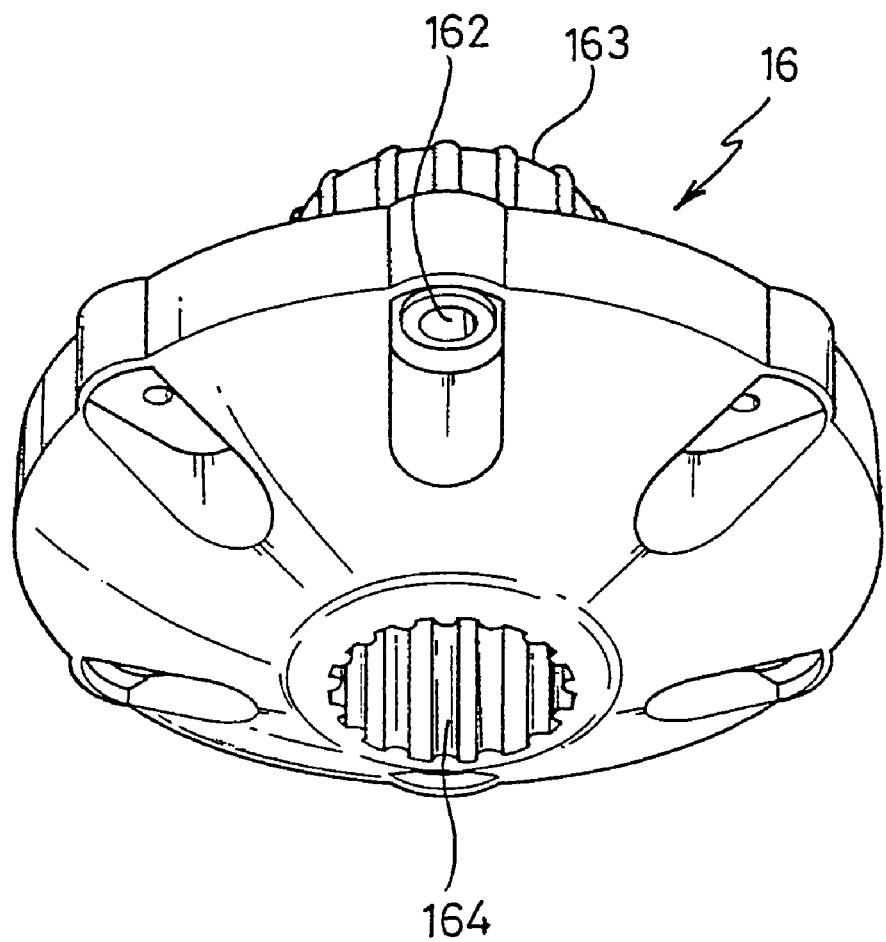
FIG. 8 illustrates a perspective view of a bottom in FIG. 7.

Reference will now be made in detail to the preferred embodiments of the present invention, examples of which are illustrated in the accompanying drawings. A first preferred embodiment of the present invention will be explained in detail with reference to FIGS. 2A~8. FIG. 2A illustrates a longitudinal section of a drum type washing machine in accordance with a first preferred embodiment of the present invention, FIG. 2B illustrates a detailed enlarged view of "A" part in FIG. 2A, FIG. 3 illustrates a perspective view with a partial cut away view of the rotor in FIG. 2, FIG. 4 illustrates an enlarged perspective view of "B" part in FIG. 3, FIG. 5 illustrates a perspective view of a bottom in FIG. 3, FIG. 6 illustrates a perspective view of the stator in FIG. 2, FIG. 7 illustrates a perspective view of the connector in FIG. 2, and FIG. 8 illustrates a perspective view of a bottom in FIG. 7.

The drum type washing machine in accordance with a first preferred embodiment of the present invention includes a tub 2 of plastic mounted inside of the cabinet 1, a drum 3 mounted in the tub 2, a shaft 4 fixed to the drum 3 for transmission of driving power from a motor 5 to the drum 3, bearings 6a and 6b fitted on outer circumference of the shaft 4 at both ends thereof, and bearing housings 7 of metal fitted to support the bearings 6a and 6b at a central portion of a rear wall 200 of the tub 2. The bearing housing 7 of metal is formed as a unit with the tub rear wall 200 by an inserted injection molding in the injection molding of the tub 2 of plastic. The bearing housing 7 is preferably formed of aluminum. The bearing housing 7 has steps 8a and 8b for holding the front bearing 6a and the rear bearing 6b fitted in inner circumferences of the bearing housing 7 for preventing the bearings 6a and 6b from being fallen off. Of the steps 8a and 8b formed on the inner circumferences of the bearing housing 7, the front step 8a has a form of "⌐" for supporting a rear end portion of the front bearing 6a fitted to a front end of an outer circumference of the shaft 4, and the rear step 8b has a form of "⌐" for supporting a front end portion of the rear bearing 6b fitted to a rear end portion of the shaft 4. And, there are positioning steps 400a and 400b on outer circumferences of the shaft 4 disposed inside of the bearing housing 7 which transmits driving power from the motor 5 to the drum 3, for fixing mounting positions of the front bearing 6a and the rear bearing 6b on the shaft 4. A front end of the shaft 4 is coupled to a spider 10 in a rear wall of the drum 3, a region of the shaft 4 from a portion exposed in rear of the spider 10 to the front bearing 6a has a bushing 11 of brass press fit thereon for prevention of rusting, and there is a sealing member 12 on an outer surface of the bushing 11 for preventing ingress of water toward the bearing. There is a rotor 13 of a direct coupling type motor 5 fixed to a center of a rear end of the shaft 4, and a stator 14 of a crown form, consisting the direct coupling type motor 5 together with the rotor 13, fixed to the rear wall 200 inside of the rotor 13.

Figure 3:
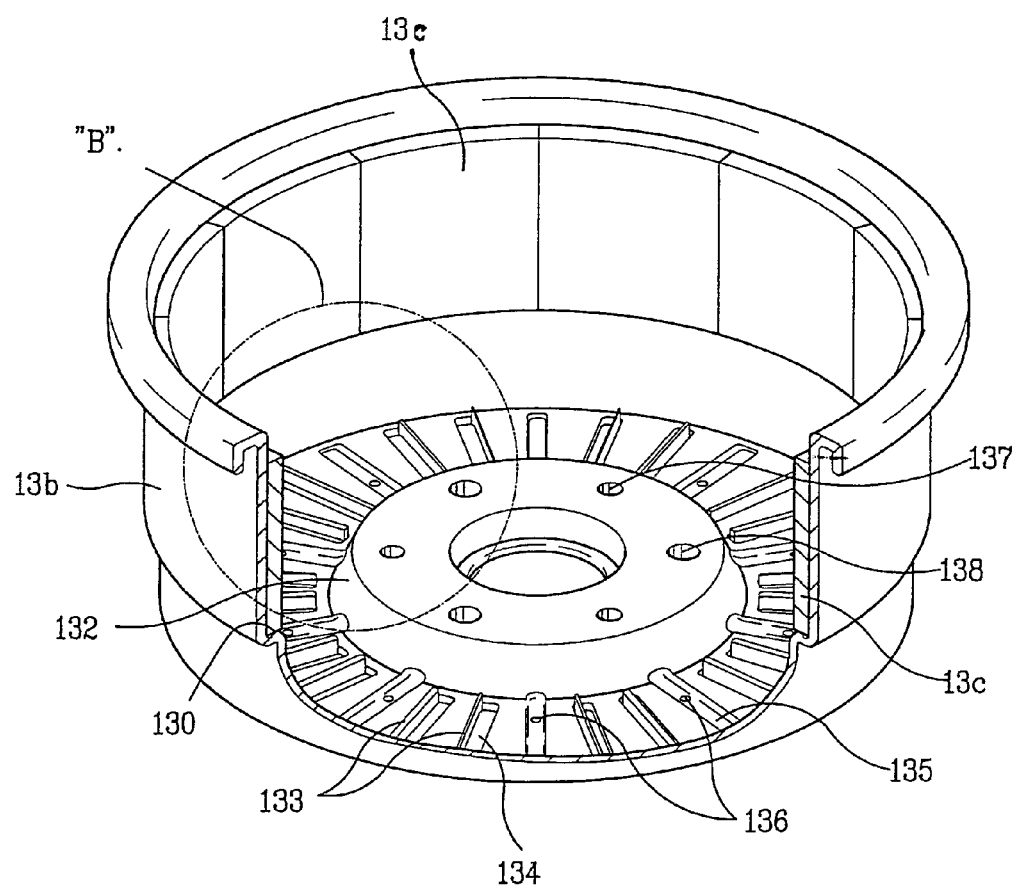
FIG. 3 illustrates a perspective view with a partial cut away view of the rotor in FIG. 2.
Figure 4:
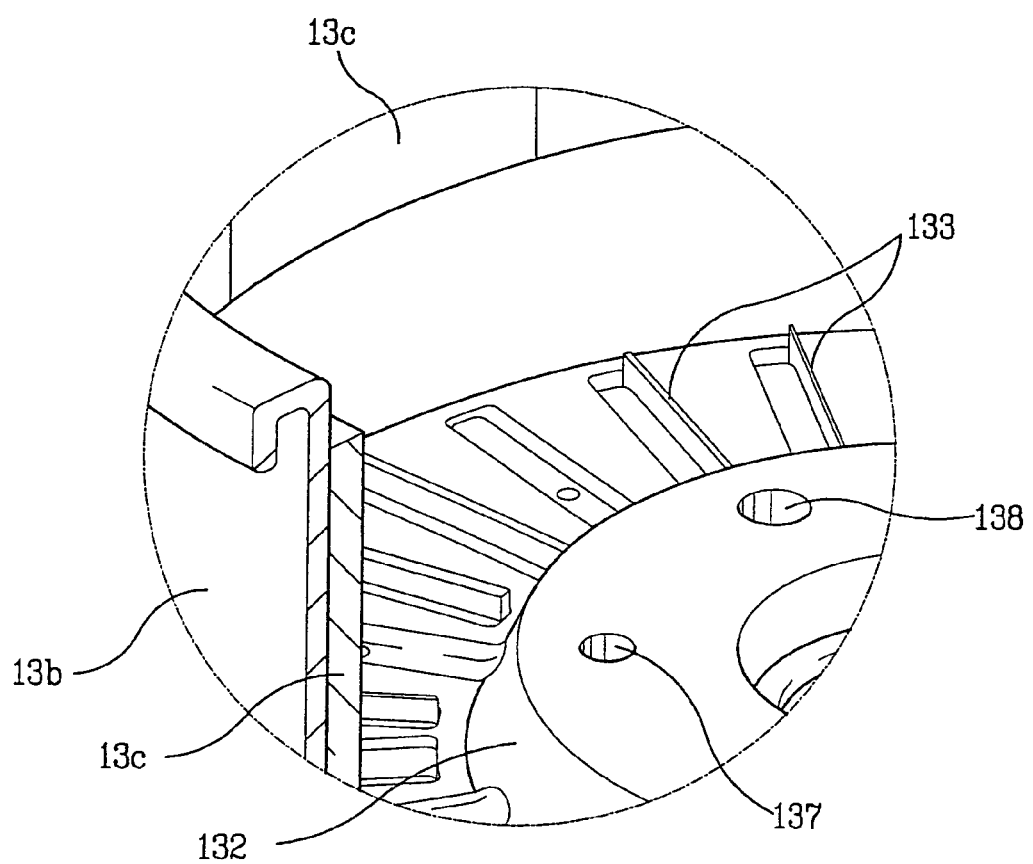
FIG. 4 illustrates an enlarged perspective view of "B" part in FIG. 3.
Figure 5:
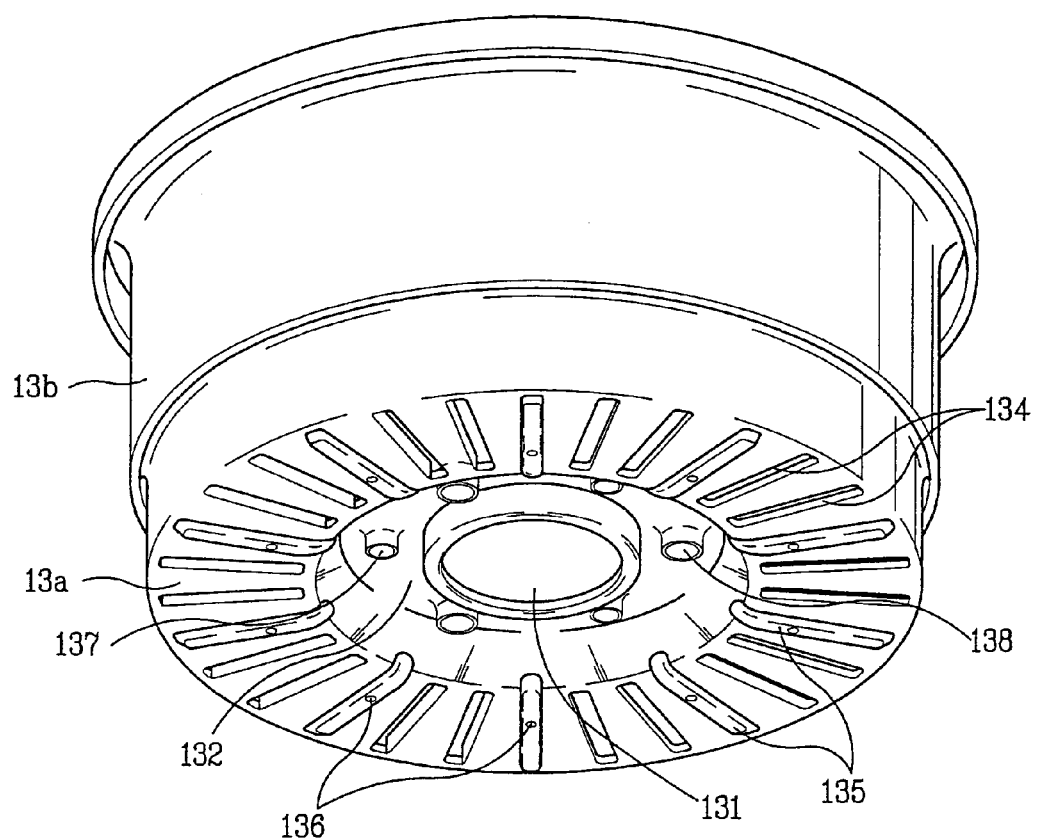
FIG. 5 illustrates a perspective view of a bottom in FIG. 3.

Referring to FIGS. 3~5, the rotor 13 of steel or steel alloy plate includes a bent portion formed along a circumference thereof having a setting surface 130 for supporting magnets 13c fitted to an inside of front of a sidewall 13b extended forward from a periphery of a rear wall 13a, and a hub 132 at a center of the rear wall 13a having a through hole 131 for fastening members 15a, such as bolts, for coupling the rotor 13 to the shaft 4. An overall form of the rotor 13 is preferably formed by press forming. There are a plurality of cooling fins 133 each formed to have a preset length in a radial direction around the hub 132 of the rotor 13 for blowing air toward the stator 14 during rotation of the rotor 13 for cooling heat generated at the stator 14. The cooling fins 133 are formed by lancing, to bend the cooling fins 133 at a right angle to the rear wall toward the opening to leave through holes 134 for ventilation. There is an embossing 135 between adjacent cooling fins 133 with a drain hole 136 therein for draining water. There are fastening holes 137 for fastening a connector 16 to the rotor 13 and positioning holes 138 for positioning an assembly position of the connector 16 around the through hole 131 in the hub 132 of the rotor 13 at fixed intervals, which connector 16 is serration coupled to an outer circumference of a rear end portion of the shaft 4 exposed to rear of the rear bearing 6b. The connector 16 is formed of resin having a vibration mode different from the rotor 13 of steel or steel alloy plate, and also serves as a bushing for the rotor 13. As shown in FIGS. 2B, 7 and 8, the connector 16 has fastening holes 162 to correspond to the fastening holes 137 in the hub 132 of the rotor 13 around a circumferential direction of the a peripheral region and a dowel pin 160 between adjacent fastening holes 162 as a unit with the connector 16 for insertion in the positioning hole 138 in the rotor 13 for self alignment of the fastening holes 137 and 162 in the rotor 13 and the connector 16, respectively. The connector 16 has a serration in an inside circumference of the hub 163 matched to the serration in the rear end of the shaft 4, and reinforcing ribs 161 on outer circumference of the hub 163 for reinforcing the hub 163. There is a hub 201 on the rear wall 200 of the tub 2 having the bearing housing 7 inserted therein when the tub is injection molded, and fastening bosses 202 on an outer side of the hub 201 along a circumferential direction at fixed intervals for fastening the stator 14 to the rear wall 200 of the tub 2. There is a supporter 17 between the rear wall 200 of the tub 2 and the stator 14, of a form almost identical to an outline of the tub rear wall 200, fixed to the tub rear wall 200 when the stator 14 is assembled for supporting the stator 14 and maintaining concentricity of the stator 14. The supporter 17 has a fore end brought into a close contact with an inside of ribs 203 at one side of the tub rear wall 200, and a rear end brought into a close contact with an outer circumference of a rear end of the bearing housing 7 which is not enclosed by the hub 132, but exposed. In the meantime, as shown in FIGS. 2B and 6, the stator 14 includes a magnetic core 145 of segregated layers of magnetic material, a frame 140 of resin coated on the magnetic core 145, a coil 142 wound around each of winding parts 141 on an outer circumference of the frame 140, and fastening ribs 143 on an inside of the frame 140 for fastening the stator 14 to the tub rear wall 200.

The operation of the driving unit in a drum type washing machine in accordance with a first preferred embodiment of the present invention will be explained. Upon causing rotation of the rotor 13 by making a current to flow to the coils 142 of the stator 14 in a sequence under the control of a motor driving controller(not shown) fitted on a panel, the shaft 4 serration coupled with the connector 16 fixed to the rotor is rotated, together with the drum 3 as the power is transmitted to the drum 3 through the shaft 4.

In the meantime, the drum type washing machine having the driving unit of the present invention applied thereto serves as follows. The tub 2 of the drum type washing machine of the present invention, formed of a plastic with an excellent heat resistance, is light and has a good formability as the tub 2 is injection molded. Since the bearing housing 7 in the drum type washing machine of the present invention is formed of a metal, such as aluminum and the like, the bearing housing 7 is applicable to a drum type washing machine having a drying cycle as the bearing housing shows no thermal deformation. And, since the metallic bearing housing 7 of the present invention is formed integrated with the tub 2 by inserting the bearing housing 7 in the hub 201 on the tub rear wall 200 before the tub 2 of plastic is injection molded, a separate step for assembling the bearing housing 7 to the tub rear wall 200 can be omitted, which simplifies an assembly process, that reduces assembly man-hours. The "⌐" form of the step 8a in a front portion of an inner circumference of the bearing housing 7 and the "⌐" form of the step 8b in a rear portion of an inner circumference of the bearing housing 7 permit to support a rear end of the front bearing 6a and a fore end of the rear bearing 6b mounted on outer circumference of the shaft 4 at both end portions thereof. That is, the steps 8a and 8b on inner circumferences of the metallic bearing housing 7 on both sides thereof prevent both bearings 6a and 6b from being fallen off the bearing housing 7. The positioning steps 400a and 400b on outer circumferences of the shaft 4 at front and rear portions thereof permit easy positioning of the front bearing 6a and the rear bearing 6b on the shaft 4 in the assembly. The front end portion of the shaft 4 is coupled to the spider 10 in the rear wall, and the brass bushing 11 press fit to the region from the exposed portion outside of the spider 10 of the shaft 4 to the front bearing 6a prevents rusting of the shaft 4. The sealing member 12 outside of the bushing 11 prevents ingress of water toward the bearing.

In the meantime, the rotor 13 of the direct coupling type motor 5 is mounted on a center of the rear end portion of the shaft 4, with the stator 14 disposed on inner side of the rotor, wherein the bend part having the magnet setting surface 130 is formed along a circumferential direction of the sidewall 13b extended forward from a periphery of the rear wall 13a of the rotor 13, for supporting the magnets 13c when the magnets 13c are fitted to an inside surface of the rotor 13, to fabricate the rotor with easy. The through hole 131 of the hub 132 at a center of the rear wall 13a of the rotor 13 permits the fastening member 15b, such as a bolt or the like, to pass therethrough for fastening the rotor 13 to the shaft 4, and the plurality of cooling fins 133 around the hub 132 of the rotor 13 in a radial direction with a length blow air toward the stator 14 during rotation of the rotor 13 for cooling down a heat generated at the stator 14. The cooling fins 133 are formed by lancing, to direct toward the opening of the rotor 13, and to leave through holes 134 for ventilation. The rotor 13 of steel or steel alloy plate is formed by pressing, which shortens a fabrication time period, that improves a productivity. The embossing 135 between the adjacent cooling fins 133 of the rear wall 13a of the rotor 13 improves an overall strength of the rotor 13, and the drain hole 136 in the embossing 135 drains water.

In the meantime, the fastening holes 137 for fastening the connector and the positioning holes 138 for fixing an assembly position of the connector 16 around the through hole 131 in the hub 132 of the rotor 13 permits an easy assembly of the connector 16 to the rotor, which connector 16 is serration coupled to the outer circumference of the rear end portion of the shaft 4 exposed to rear of the rear bearing 6b. That is, once the dowel pins 160 on the connector 16 are inserted in the positioning holes 138 in the rotor 13, the fastening holes 137 and 162 in the rotor 13 and the connector 16 are matched automatically, and by fastening the fastening members 15c through the fastening holes 137 and 162 in the rotor 13 and the connector 16, the connector 16 and the rotor 13 can be assembled with easy. The connector 16 serves to damp vibration from the rotor 13 to the shaft 4 as the connector 16 injection molded of a resin has a different vibration mode from the rotor 13 of steel or steel alloy plate. The serration 164 in the inner circumference of the hub 163 of the connector 16 is fit to the serration 400 in the rear end portion of the shaft 4, to transmit the rotating force of the rotor 13 to the shaft, directly. The reinforcing ribs 161 on an outer circumference of the hub 163 of the connector 16 reinforce the hub 163.

In the meantime, the fastening bosses 202 along a circumference on an outer side of the hub 201 on the rear wall 200 of the tub 2 at fixed intervals permits to fix the stator 14 to the rear wall 200 of the tub 2 by using the fastening boss 202. The supporter 17 between the rear wall 200 of the tub 2 and the stator 14 having a form almost identical to the outline of the rear wall 200 for being fixed to the rear wall 200 of the tub 2 when the stator 14 is fastened permits the stator 14 being supported and maintained of concentricity. That is, once the supporter 17 is fastened to the fastening bosses 204 on the tub rear wall 200, the fore end of the supporter 17 is brought into close contact with an inside surface of the ribs 203 at one side of the tub rear wall 200 and the rear end of the supporter 17 is brought into close contact with the outer circumference of the rear end portion of the bearing housing 7 at a central portion of the tub rear wall 200, which can not be enclosed, but exposed, by the hub 132, such that the supporter 17 supports the stator 14 as well as maintains a concentricity of the stator 14.

The structure of a driving unit in a drum type washing machine in accordance with a first preferred embodiment of the present invention has the following advantages.

The motor direct coupling structure of the drum type washing machine in accordance with a first preferred embodiment of the present invention permits to reduce repair, and power loss.

The bearing housing of metal in the drum type washing machine in accordance with a first preferred embodiment of the present invention shows no thermal deformation, that allows to apply to a product having a drying function.

The rotor of steel or steel alloy plate formed by pressing in the drum type washing machine in accordance with a first preferred embodiment of the present invention requires a very short fabrication time period, with an improved productivity, because the steel or steel alloy plate pressing has an excellent formability.

And, the magnet setting surface on the rotor of the present invention improves a workability in fitting the magnets, and the drain holes, the cooling fins, and the through holes provided to the rotor can prevent overheating of the motor, improve a reliability of the motor, and prolong a lifetime of the motor.

And, the connector having a vibration mode different from the rotor in the drum type washing machine of the present invention can attenuate the vibration transmitted from the rotor to the shaft, and the supporter can support the stator and maintain a concentricity of the stator.

Figure 9:
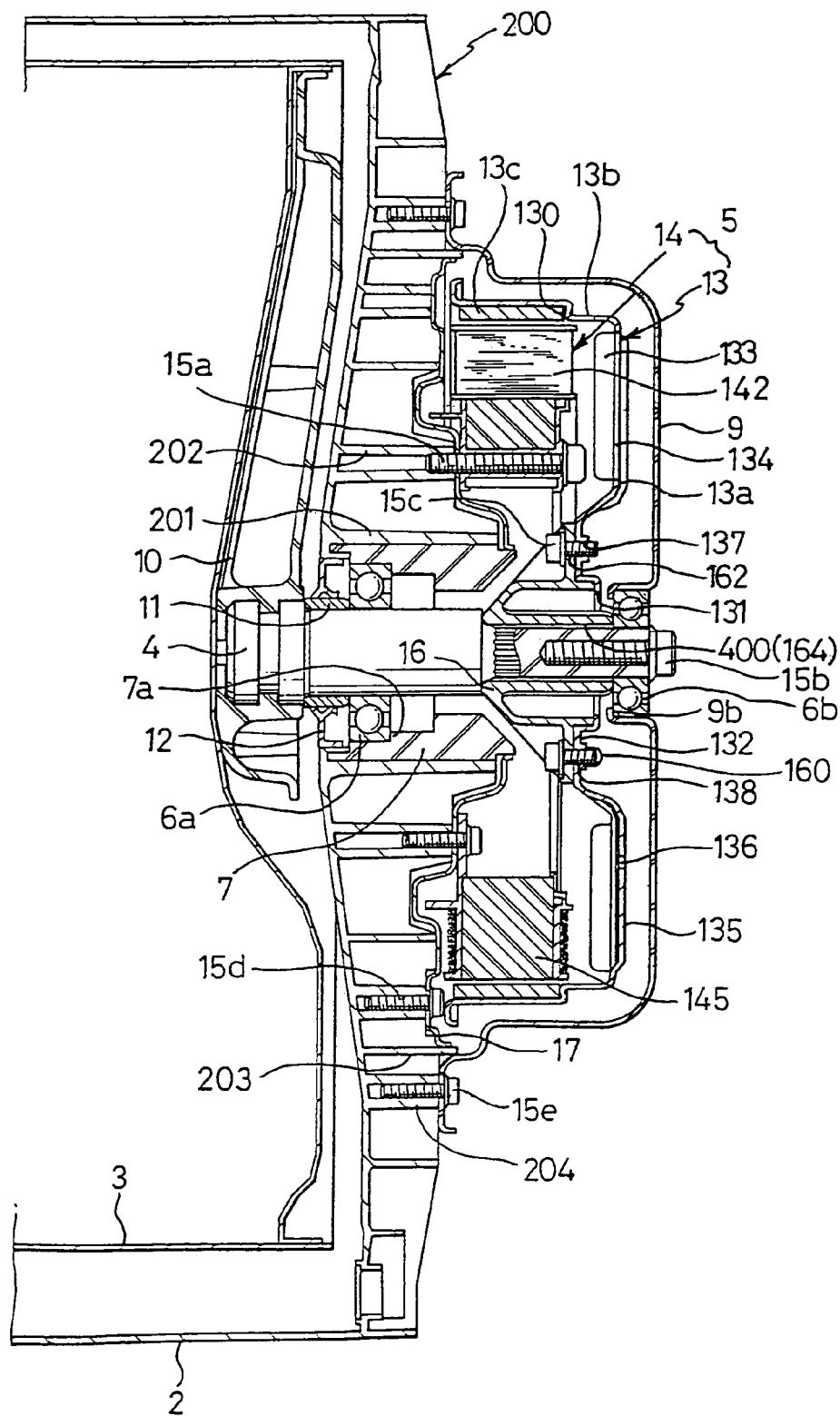
FIG. 9 illustrates a longitudinal section of a driving unit in a drum type washing machine in accordance with a second preferred embodiment of the present invention.

A driving unit in a drum type washing machine in accordance with a second preferred embodiment of the present invention will be explained with reference to FIGS. 3~9, in detail. FIG. 9 illustrates a longitudinal section of a driving unit in a drum type washing machine in accordance with a second preferred embodiment of the present invention. The rotor, the stator and the connector in the second preferred embodiment of the present invention are identical to those of the first embodiment, to which the same names and reference symbols are given, and will be explained with reference to FIGS. 3~8.

The drum type washing machine in accordance with a second preferred embodiment of the present invention includes a tub 2 mounted inside of a cabinet 1, a drum 3 mounted inside of the tub 2, a shaft 4 connected to the drum mounted inside of the tub 3 for transmission of a driving force from the motor 5 to the drum, a front bearing 6a and a rear bearing 6b mounted on outer circumferences of the shaft 4 at both end portions thereof respectively, a bearing housing 7 built in a central portion of the rear wall 200 of the tub 3 for supporting the front bearing 6a, a rotor 13 coupled to the shaft 4, a stator 14 provided inward of the rotor 13 coupled to the tub rear wall 200, a connector 16 serration coupled to an outer circumference of the shaft 4 in front of the rear bearing 6b and fixed to the rotor 13 for transmission of a rotating force of the rotor 13 to the shaft 4, a supporter 17 fitted between the rear wall 200 of the tub 2 and the stator 14 for supporting the stator and maintaining a concentricity when the stator is mounted to the tub rear wall 200, and a bearing bracket 9 fixed to the tub rear wall 200 for covering outside of the rotor 13 and supporting the front end portion of the rear bearing 6b. The tub 2 is formed of plastic, and has an opened front and a closed rear wall 200 of which thickness is greater than a thickness of a sidewall, and the bearing housing 7 at the central portion of the rear wall 200 of the tub 2 is formed of a metal, wherein the bearing housing 7 is insert injection molded when the plastic tub 2 is injection molded, such that the bearing housing 7 is integrated with the tub rear wall 200. The bearing housing 7 is preferably formed of an aluminum alloy.

In the meantime, there is a step 7a on an inner circumference of the metallic bearing housing 7 for supporting the front bearing 6a to prevent the front bearing 7 from being fallen off the bearing housing 7. The step 7a on the inner circumference of the bearing housing 7 has a form of "⌐" for having a structure which supports a rear end portion of the front bearing 6a mounted on a front end portion of the shaft 4. The front end portion of the shaft 4 is fixed to a spider 10 in the rear wall 200 of the drum 3, a region of the shaft 4 from a portion exposed in rear of the spider 10 to the front bearing 6a has a bushing 11 of brass press fit thereon for prevention of rusting, and there is a sealing member 12 on an outer surface of the bushing 11 for preventing ingress of water toward the front bearing 6a. There connector 16 is serration coupled to the rear end portion of the shaft 4 for connection between the rotor 13 of the direct coupling type motor 5 and the shaft 4, the rotor 13 is fixed to the connector 16 with fastening members 15c, and the stator 14, forming the direct coupling type motor together with the rotor 13, is fixed to the rear wall 200 of the tub 2 inward of the rotor 13. As shown in FIGS. 3~5, the rotor 13 of steel or steel alloy plate includes a bend part having a magnet setting surface 130 formed along a circumferential direction of a sidewall 13b extended forward from a periphery of the rear wall 13a of the rotor 13, for supporting magnets 13c fitted to a front portion of an inside surface of the rotor 13, and a hub 132 having a through hole 131 at a center of the rear wall 13a of the rotor 13 so that a fastening member 15a, such as a bolt or the like, can pass through for coupling the rotor 13 to the shaft 4. An overall form of the rotor 13 is preferably formed by pressing. There are a plurality of cooling fins 133 each formed to have a preset length in a radial direction around the hub 132 of the rotor 13 for blowing air toward the stator 14 during rotation of the rotor 13 for cooling heat generated at the stator 14. The cooling fins 133 are formed by lancing, to bend the cooling fins 133 at a right angle to the rear wall 13a toward the opening to leave through holes 134 for ventilation. There is an embossing 135 between adjacent cooling fins 133 with a drain hole 136 therein for draining water. There are fastening holes 137 for fastening a connector 16 to the rotor 13 and positioning holes 138 for positioning an assembly position of the connector 16 around the through hole 131 in the hub 132 of the rotor 13 at fixed intervals, which connector 16 is serration coupled to an outer circumference of a rear end portion of the shaft 4 exposed in rear of the rear bearing 6b. The connector 16 is formed of resin having a vibration mode different from the rotor 13 of steel or steel alloy plate. As shown in FIGS. 7~9, the connector 16 has fastening holes 162 to correspond to the fastening holes 137 in the hub 132 of the rotor 13 around a circumferential direction of the a peripheral region and a dowel pin 160 between adjacent fastening holes 162 as a unit with the connector 16 for insertion in the positioning hole 138 in the rotor 13 for self alignment of the fastening holes 137 and 162 in the rotor 13 and the connector 16, respectively. The connector 16 has a serration in an inside circumference of the hub 163 matched to the serration in the rear end of the shaft 4, and reinforcing ribs 161 on outer circumference of the hub 163 for reinforcing the hub 163. There is a hub 201 on the rear wall 200 of the tub 2 having the bearing housing 7 inserted therein when the tub is injection molded, and fastening bosses 202 on an outer side of the hub 201 along a circumferential direction at fixed intervals for fastening the stator 14 to the rear wail 200 of the tub 2. There is a supporter 17 between the rear wall 200 of the tub 2 and the stator 14, of a form almost identical to an outline of the rear wall 200, fixed to the tub 2 rear wall 200 when the stator 14 is assembled for supporting the stator 14 and maintaining concentricity of the stator 14. Once the supporter 17 is fastened to the support fastening bosses 204, a fore end of the supporter 17 is brought into close contact with an inside of ribs 203 at one side of the tub rear wall 200 and a rear end thereof is brought into close contact with an outer circumference of a rear end of the bearing housing 7 which is not enclosed by the hub 132, but exposed, thereby the supporter 17 supporting the stator 14 and maintaining a concentricity of the stator. In the meantime, as shown in FIGS. 3 and 6, the stator 14 includes a ring formed frame 140, a coil 142 wound around each of winding parts 141 on an outer circumference of the frame 140, and fastening ribs 143 on an inside of the frame 140 for fastening the stator 14 to the tub rear wall 200.

In the meantime, referring to FIG. 9, there is an "⌊" formed step 900b at an inner end portion of the bearing bracket 9 fixed to the tub rear wall 200 to cover an outer side of the rotor 13. And, there is a rear bearing fixing member 15b at an rear end of the shaft 4 for supporting a rear surface of the shaft 4 to prevent the rear bearing from being fallen off the shaft 4.

The operation of the driving unit in a drum type washing machine in accordance with a second preferred embodiment of the present invention will be explained. Upon causing rotation of the rotor 13 by making a current to flow to the coils 142 of the stator 14 in a sequence under the control of a motor driving controller(not shown) fitted on a panel, the shaft 4 serration coupled with the connector 16 fixed to the rotor is rotated, together with the drum 3 as the power is transmitted to the drum 3 through the shaft 4.

In the meantime, the drum type washing machine in accordance with the second preferred embodiment of the present invention driven thus serves as follows. Alike the first embodiment of the present invention, since the tub 1 is formed of a plastic with an excellent heat resistance, the tub 1 is light and has a good formability as the tub 2 is injection molded. Since the bearing housing 7 is formed of a metal, such as an aluminum alloy and the like, the bearing housing 7 is applicable to a drum type washing machine having a drying cycle as the bearing housing shows no thermal deformation. And, since the metallic bearing housing 7 is formed integrated with the tub 2 by inserting the bearing housing 7 in the hub 201 on the tub rear wall 200 before the tub 2 of plastic is injection molded, a separate step for assembling the bearing housing 7 to the tub rear wall 200 can be omitted, which simplifies an assembly process, that reduces assembly man-hours. The step 7a in an inner circumference of a front portion of the bearing housing 7 in the second embodiment of the present invention supports a rear end of the front bearing 6a mounted on an outer circumference of the fore end portion of the shaft 4. That is, the "⌉" formed step 7a in a front portion of an inner circumference of the metallic bearing housing 7 of the present invention permits to support the front bearing 6a without being fallen off the bearing housing 7. And, the "⌊" formed step 900b in an end portion of an inner circumference of the metallic bearing bracket 9 covering an outer side of the rotor 13 fixed to the tub rear wall 200 permits to support a front end of the rear bearing 6b mounted on the rear end portion of the shaft 4, and the rear bearing fixing member 15b on the rear end surface of the shaft 4 prevents the rear bearing 6b from being fallen off the shaft 4.

In the meantime, in the second preferred embodiment of the present invention, since the front bearing 6a is mounted in the bearing housing 7 having insert injection molded in the tub 1, and the rear bearing 6b is mounted in an inside of a center portion of the bearing bracket 9, a distance between the front and rear bearings 6a and 6b on the shaft 4 becomes greater, between which the rotor is mounted. The greater distance between the front and rear bearings 6a and 6b permits to withstand a load caused by imbalance of laundry in the drum 1 during spinning better, and a supporting force to the rotor 13 is enhanced as the rotor 13 of the motor is mounted between the front and rear bearings 6a and 6b. Alike the first preferred embodiment of the present invention, in the second preferred embodiment of the present invention, the brass bushing 11 press fit to the region from the exposed portion outside of the spider 10 of the shaft 4 to the front bearing 6a prevents rusting of the shaft 4. And, alikely, the sealing member 12 outside of the bushing 11 prevents ingress of water toward the bearing.

Alike the first preferred embodiment, as shown in FIGS. 3 to 6, the bend part having the magnet setting surface 130 is formed along a circumferential direction of the sidewall 13b extended forward from a periphery of the rear wall 13a of the rotor 13, for supporting the magnets 13c when the magnets 13c are fitted to an inside surface of the rotor 13, to fabricate the rotor with easy. Alike the first preferred embodiment of the present invention, in the second preferred embodiment of the present invention, the plurality of cooling fins 133 around the hub 132 of the rotor 13 in a radial direction with a length blow air toward the stator 14 during rotation of the rotor 13 for cooling down a heat generated at the stator 14. The cooling fins 133 are formed by lancing, to direct toward the opening of the rotor 13, and to leave through holes 134 for ventilation. Since the rotor 13 is formed of steel or steel alloy plate by pressing, which shortens a fabrication time period significantly, a productivity is improved. The embossing 135 between the adjacent cooling fins 133 of the rear wall 13a of the rotor 13 improves an overall strength of the rotor 13, and the drain hole 136 in the embossing 135 drains water.

In the meantime, the fastening holes 137 for fastening the connector and the positioning holes 138 for fixing an assembly position of the connector 16 around the through hole 131 in the hub 132 of the rotor 13 permits an easy assembly of the connector 16 to the rotor, which connector 16 is serration coupled to the outer circumference of the rear end portion of the shaft 4. That is, once the dowel pins 160 on the connector 16 are inserted in the positioning holes 138 in the rotor 13, the fastening holes 137 and 162 in the rotor 13 and the connector 16 are matched automatically, and by fastening the fastening members 15c through the fastening holes 137 and 162, the connector 16 and the rotor 13 can be assembled with easy. The connector 16 serves to damp vibration from the rotor 13 to the shaft 4 as the connector 16 injection molded of a resin has a different vibration mode from the rotor 13 of steel or steel alloy plate. The serration 164 in the inner circumference of the hub 163 of the connector 16 is fit to the serration 400 in the rear end portion of the shaft 4, to transmit the rotating force of the rotor 13 to the shaft, directly. The reinforcing ribs 161 on an outer circumference of the hub 163 of the connector 16 reinforce the hub 163.

In the meantime, the fastening bosses 202 along a circumference on an outer side of the hub 201 on the rear wall 200 of the tub 2 at fixed intervals permits to fix the stator 14 to the rear wall 200 of the tub 2 by using the fastening boss 202. The supporter 17 between the rear wall 200 of the tub 2 and the stator 14 having a form almost identical to the outline of the rear wall 200 for being fixed to the rear wall 200 of the tub 2 when the stator 14 is fastened permits the stator 14 being supported and maintained of concentricity. That is, the front end of the supporter 17 is brought into close contact with an inside surface of the ribs 203 at one side of the tub rear wall 200 and the rear end of the supporter 17 is brought into close contact with the outer circumference of the rear end portion of the bearing housing 7 at a central portion of the tub rear wall 200, which can not be enclosed, but exposed, by the hub 132, such that the supporter 17 supports the stator 14 as well as maintains a concentricity of the stator 14.

The structure of a driving unit in a drum type washing machine in accordance with a second preferred embodiment of the present invention has the following advantages.

The motor direct coupling structure of the drum type washing machine of the present invention permits to reduce repair, noise and power loss.

The bearing housing of metal in the drum type washing machine of the present invention shows no thermal deformation, that allows to apply to a product having a drying function.

The rotor of steel or steel alloy plate formed by pressing in the drum type washing machine of the present invention requires a very short fabrication time period, with an improved productivity, because the steel or steel alloy plate pressing has an excellent formability.

And, the magnet setting surface on the rotor of the present invention improves a workability in fitting the magnets, and the drain holes, the cooling fins, and the through holes provided to the rotor can prevent overheating of the motor, improve a reliability of the motor, and prolong a lifetime of the motor.

And, the connector having a vibration mode different from the rotor in the drum type washing machine of the present invention can attenuate the vibration transmitted from the rotor to the shaft, and the supporter can support the stator and maintain a concentricity of the stator.

Particularly, in the second preferred embodiment of the present invention, the greater distance between the front and rear bearings permits to withstand a load caused by imbalance of laundry in the drum 1 during spinning better, and a supporting capability to the rotor is enhanced as the rotor of the motor is mounted between the front and rear bearings.

Thus, by improving a structure of a driving unit of a drum type washing machine, the present invention can reduce noise, repair and power loss, by improving a washing capability, can improve a product reliability, and, by improving workability in fabrication of components of the driving unit, can improve a productivity.

It will be apparent to those skilled in the art that various modifications and variations can be made in the structure of a driving unit in a drum type washing machine of the present invention without departing from the spirit or scope of the invention. Thus, it is intended that the present invention cover the modifications and variations of this invention provided they come within the scope of the appended claims and their equivalents.

What is claimed:

1. A washing machine, comprising:
   an outer tub formed of a molded material and configured to hold washing water, the tub including a rear wall and an integrally molded sidewall wherein a plurality of fastening bosses are formed on the outer side of the rear wall of the tub;
   a bearing housing mounted on the rear wall of the tub;
   at least one bearing mounted in the bearing housing;
   a drum rotatably mounted inside the outer tub;
   a shaft coupled to the drum and mounted in the at least one bearing in the bearing housing; and
   a motor coupled to the outer side of the rear wall of the tub and to the shaft, wherein the motor comprises:
      a single stator with wire windings, wherein the stator is coupled to the outer side of the rear wall of the tub wherein the stator includes a frame having a plurality of fastening ribs, and wherein fasteners are used to couple the fastening ribs of the stator to the fastening bosses on the rear wall of the tub, and
      a rotor coupled to the shaft and having a rear wall and a side wall integrally formed of steel, wherein the sidewall surrounds the stator, and wherein a plurality of magnets are mounted on the sidewall.

2. The washing machine of claim 1, wherein the stator frame is made of an electrically insulating material.

3. The washing machine of claim 2, wherein the frame of the stator is coupled to the rear wall of the tub such that the stator is electrically insulated from the tub.

4. The washing machine of claim 1, wherein an inner side of the rear wall of the tub includes a central portion that extends into the tub, and wherein an outer side of the rear wall of the tub has a central portion that extends away from the tub.

5. The washing machine of claim 1, wherein at outer portion of the bearing housing extends from the rear wall of the tub and is exposed.

6. The washing machine of claim 1, further comprising a rigid supporter that is mounted between the rear wall of the tub and the stator.

7. The washing machine of claim 6, wherein the rigid supporter abuts stiffening ribs that are integrally formed in the rear wall of the tub, and wherein the contact between the supporter and the stiffening ribs helps to locate the supporter during assembly of the washing machine.

8. The washing machine of claim 6, wherein the outer surface of the rear wall of the tub includes a plurality of fastening bosses that are integrally formed with the tub and that are configured to receive fasteners that are used to mount the stator to the rear wall of the tub, wherein the fastening bosses have flat outer surfaces, and wherein the supporter also includes flat portions that correspond to the flat outer surfaces of the fastening bosses, the flat portions of the supporter also having apertures therethrough to allow fasteners to pass through the supporter so that the fasteners can couple the stator the fastening bosses.

9. The washing machine of claim 6, wherein the outer surface of the rear wall of the tub includes a plurality of fastening bosses that are integrally formed with the tub and that are configured to receive fasteners that are used to mount the supporter to the rear wall of the tub, wherein the fastening bosses have flat outer surfaces, and wherein the supporter also includes flat portions that correspond to the flat outer surfaces of the fastening bosses, the flat portions of the supporter also having apertures therethrough to allow fasteners to couple the supporter to the fastening bosses.

10. The washing machine of claim 6, wherein the rigid supporter includes an outer circumferential surface that abuts stiffening ribs that are integrally formed in the rear wall of the tub, and wherein the contact between the outer circumferential surface of the supporter and the stiffening ribs helps to locate the supporter during assembly of the washing machine.

11. The washing machine of claim 6, wherein a rear portion of the bearing housing protrudes from the rear wall of the tub and is exposed, and wherein an inner circumferential surface of the supporter abuts the exposed rear portion of the bearing housing.

12. The washing machine of claim 6, wherein the supporter is generally conical in shape with the central portion of the supporter sloping away from the inside of the tub.

13. The washing machine of claim 12, wherein a series of flat steps are formed on the generally conically shaped supporter.

14. The washing machine of claim 1, wherein an outer rim of the rotor is bent relative to the sidewall to increase the rigidity of the rotor.

15. The washing machine of claim 14, wherein the outer rim is bent so that a first portion of the outer rim extends approximately perpendicular to the sidewall of the rotor, and a second portion of the outer rim extends approximately parallel to the sidewall.

16. The washing machine of claim 1, wherein an inner circumferential surface of the rotor comprises a rim that is bent to increase a rigidity of the rotor.

17. The washing machine of claim 16, wherein the inner circumferential surface of the rotor of includes a first bent portion that extends substantially perpendicular to the rear wall of the rotor, and a second bent portion that extends substantially parallel to the rear wall of the rotor.

18. The washing machine of claim 1, wherein a central portion of the rear wall of the rotor includes a flange portion having a plurality of mounting holes and a plurality of positioning holes, and wherein sidewalls of the positioning holes extend above or below the rear wall of the rotor, and wherein the motor further comprises a connector that is coupled between the shaft and the rotor, the connector including a plurality of fastening holes and a plurality of positioning projections that are integrally formed with the connector, wherein the fastening holes and the positioning projections are formed around the circumference of the connector such that the fastening holes align with the mounting holes on the rotor and the positioning projections extend into the positioning holes on the rotor when the connector is coupled to the rotor.

19. The washing machine of claim 18, wherein the connector is formed of an electrically insulating material.

20. A washing machine, comprising:
an outer tub formed of a molded material and configured to hold washing water, the tub including a rear wall and an integrally molded sidewall;
a bearing housing mounted on the rear wall of the tub;
at least one bearing mounted in the bearing housing;
a drum rotatably mounted inside the outer tub;
a shaft coupled to the drum and mounted in the at least one bearing in the bearing housing; and
a motor coupled to the outer side of the rear wall of the tub and to the shaft, wherein the motor comprises:
a single stator coupled to the outer side of the rear wall of the tub and having a wound core, and
a rotor having a rear wall and a sidewall that surround the stator, wherein a plurality of magnets are mounted on the sidewall; and
a separate connector that is coupled between the rotor and the shaft.

21. The washing machine of claim 20, wherein the stator includes a frame made of an electrically insulating material.

22. The washing machine of claim 21, wherein the frame comprises a plurality of fastening ribs that are used to couple the stator to the rear wall of the tub such that the stator is electrically insulated from the tub.

23. The washing machine of claim 20, wherein the stator includes a frame having a plurality of fastening ribs that are used to couple the stator to the rear wall of the tub.

24. The washing machine of claim 20, further comprising a rigid supporter that is mounted between the rear wall of the tub and the stator.

25. The washing machine of claim 24, wherein the rigid supporter abuts stiffening ribs that are integrally formed in the rear wall of the tub, and wherein the contact between the supporter and the stiffening ribs helps to locate the supporter during assembly of the washing machine.

26. The washing machine of claim 24, wherein the outer surface of the rear wall of the tub includes a plurality of fastening bosses that are integrally formed with the tub and that are configured to receive fasteners that are used to mount the stator to the rear wall of the tub, wherein the fastening bosses have flat outer surfaces, and wherein the supporter also includes flat portions that correspond to the flat outer surfaces of the fastening bosses, the flat portions of the supporter also having apertures therethrough to allow fasteners to pass through the supporter so that the fasteners can couple the stator the fastening bosses.

27. The washing machine of claim 24, wherein the outer surface of the rear wall of the tub includes a plurality of fastening bosses that are integrally formed with the tub and that are configured to receive fasteners that are used to mount the supporter to the rear wall of the tub, wherein the fastening bosses have flat outer surfaces, and wherein the supporter also includes flat portions that correspond to the flat outer surfaces of the fastening bosses, the flat portions of the supporter also having apertures therethrough to allow fasteners to couple the supporter to the fastening bosses.

28. The washing machine of claim 24, wherein the rigid supporter includes an outer circumferential surface that abuts stiffening ribs that are integrally formed in the rear wall of the tub, and wherein the contact between the outer circumferential surface of the supporter and the stiffening ribs helps to locate the supporter during assembly of the washing machine.

29. The washing machine of claim 24, wherein a rear portion of the bearing housing extends from the rear wall of the tub and is exposed, and wherein an inner circumferential surface of the supporter abuts the exposed rear portion of the bearing housing.

30. The washing machine of claim 24, wherein the supporter is generally conical in shape with the central portion of the supporter sloping away from the inside of the tub.

31. The washing machine of claim 30, wherein a series of flat steps are formed on the generally conically shaped supporter.

32. The washing machine of claim 20, wherein the rotor of the motor is formed of steel.

33. The washing machine of claim 32, wherein an outer rim of the rotor is bent relative to the sidewall to increase the rigidity of the rotor.

34. The washing machine of claim 33, wherein the outer rim is bent so that a first portion of the outer rim extends approximately perpendicular to the sidewall of the rotor, and a second portion of the outer rim extends approximately parallel to the sidewall.

35. The washing machine of claim 32, wherein an inner circumferential surface of the rotor comprises a rim that is bent to increase a rigidity of the rotor.

36. The washing machine of claim 35, wherein the inner circumferential surface of the rotor of includes a first bent portion that extends substantially perpendicular to the rear wall of the rotor, and a second bent portion that extends substantially parallel to the rear wall of the rotor.

37. The washing machine of claim 20, wherein a central portion of the rear wall of the rotor includes a flange portion having a plurality of mounting holes and a plurality of positioning holes, and wherein sidewalls of the positioning holes extend above or below the rear wall of the rotor, and wherein the connector includes a plurality of fastening holes and a plurality of positioning projections that are integrally formed with the connector, wherein the fastening holes and the positioning projections are formed around the circumference of the connector such that the fastening holes align with the mounting holes on the rotor and the positioning projections extend into the positioning holes on the rotor when the connector is coupled to the rotor.

38. The washing machine of claim 37, wherein the connector is formed of an electrically insulating material.

39. The washing machine of claim 20, further comprising a plurality of fasteners that are used to couple the rotor to the connector.

40. The washing machine of claim 39, wherein a plurality of threaded mounting holes are formed in the rear wall of the rotor, and wherein the plurality of fasteners pass through the connector and into the mounting holes on the rear wall of the rotor to couple the connector to the rotor.

41. The washing machine of claim 40, wherein a plurality of positioning holes are formed in the rotor, and wherein a plurality of positioning projections are formed on the connector, and wherein the positioning projections on the connector are received in the positioning holes of the rotor when the connector is coupled to the rotor.

42. The washing machine of claim 41, wherein a diameter of the positioning projections on the connector is larger than a diameter of the mounting holes on the rotor such that the positioning projections cannot be inserted into the mounting holes.

43. The washing machine of claim 20, wherein a plurality of positioning holes are formed in the rotor, and wherein a plurality of positioning projections are formed in the connector, and wherein the positioning projections on the connector are received in the positioning holes of the rotor when the connector is coupled to the rotor.

44. The washing machine of claim 20, wherein the connector is formed of an electrically insulating material such that when the rotor is coupled to the connector, and the connector is coupled to the shaft, the rotor is electrically insulated from the shaft.

45. A washing machine, comprising:
an outer tub formed of a molded material and configured to hold washing water, the tub including a rear wall and an integrally molded sidewall, wherein the outer surface of the rear wall of the tub includes a plurality of fastening bosses that are integrally formed with the tub and that have flat outer surfaces that are configured to receive fasteners;
a bearing housing that is mounted on the rear wall of the tub;
at least one bearing mounted in the bearing housing;
a drum rotatably mounted inside the outer tub;
a shaft coupled to the drum and mounted in the at least one bearing in the bearing housing;
a motor coupled to the outer side of the rear wall of the tub and to the shaft, wherein the motor comprises:
a stator coupled to the outer side of the rear wall of the tub, and
a rotor coupled to the shaft and having a rear wall and a side wall that surrounds the stator; and
a rigid supporter that is mounted between the rear wall of the tub and the stator, wherein the supporter includes flat portions that correspond to the flat outer surfaces of the fastening bosses on the rear wall of the tub, and wherein the flat portions of the supporter have apertures therethrough to allow fasteners to pass through the supporter so that the fasteners can couple the stator to the fastening bosses.

46. A washing machine, comprising:
an outer tub formed of a molded material and configured to hold washing water, the tub including a rear wall and an integrally molded sidewall, wherein the outer surface of the rear wall of the tub includes a plurality of fastening bosses that are integrally formed with the tub and that have flat outer surfaces that are configured to receive fasteners;
a bearing housing that is mounted on the rear wall of the tub;
at least one bearing mounted in the bearing housing;
a drum rotatably mounted inside the outer tub;

a shaft coupled to the drum and mounted in the at least one bearing in the bearing housing;
a motor coupled to the outer side of the rear wall of the tub and to the shaft, wherein the motor comprises:
   a stator coupled to the outer side of the rear wall of the tub, and
   a rotor coupled to the shaft and having a rear wall and a side wall that surrounds the stator; and
a rigid supporter that is mounted between the rear wall of the tub and the stator, wherein the supporter includes flat portions that correspond to the flat outer surfaces of the fastening bosses on the rear wall of the tub, and wherein the flat portions of the supporter have apertures therethrough to allow fasteners to pass through the supporter so that the fasteners can couple the supporter to the fastening bosses.

47. A washing machine, comprising:
an outer tub formed of a molded material and configured to hold washing water, the tub including a rear wall and an integrally molded sidewall, wherein stiffening ribs are integrally formed in the rear wall of the tub;
a bearing housing that is mounted on the rear wall of the tub;
at least one bearing mounted in the bearing housing;
a drum rotatably mounted inside the outer tub;
a shaft coupled to the drum and mounted in the at least one bearing in the bearing housing;
a motor coupled to the outer side of the rear wall of the tub and to the shaft, wherein the motor comprises:
   a stator coupled to the outer side of the rear wall of the tub, and
   a rotor coupled to the shaft and having a rear wall and a side wall that surrounds the stator; and
a rigid supporter that is mounted between the rear wall of the tub and the stator, wherein the supporter includes an outer circumferential surface that is configured to abut at least some of the stiffening ribs on the rear wall of the tub, and wherein contact between the outer circumferential surface of the supporter and the stiffening ribs helps to locate the supporter during assembly of the washing machine.

48. A washing machine, comprising:
an outer tub formed of a molded material and configured to hold washing water, the tub including a rear wall and an integrally molded sidewall;
a bearing housing that is mounted on the rear wall of the tub;
at least one bearing mounted in the bearing housing;
a drum rotatably mounted inside the outer tub;
a shaft coupled to the drum and mounted in the at least one bearing in the bearing housing;
a motor coupled to the outer side of the rear wall of the tub and to the shaft, wherein the motor comprises:
   a stator coupled to the outer side of the rear wall of the tub, and
   a rotor coupled to the shaft and having a rear wall and a side wall that surrounds the stator; and
a rigid supporter that is mounted between the rear wall of the tub and the stator, wherein the supporter is generally conical in shape with the central portion of the supporter sloping away from the inside of the tub, and wherein a series of flat steps are formed on the generally conical shaped supporter.

49. A washing machine, comprising:
an outer tub formed of a molded material and configured to hold washing water, the tub including a rear wall and an integrally molded sidewall, wherein stiffening ribs are integrally formed in the rear wall of the tub;
a bearing housing that is mounted on the rear wall of the tub;
at least one bearing mounted in the bearing housing;
a drum rotatably mounted inside the outer tub;
a shaft coupled to the drum and mounted in the at least one bearing in the bearing housing;
a motor coupled to the outer side of the rear wall of the tub and to the shaft, wherein the motor comprises:
   a stator coupled to the outer side of the rear wall of the tub, and
   a rotor coupled to the shaft and having a rear wall and a side wall that surrounds the stator; and
a rigid supporter mounted between the rear wall of the tub and the stator, wherein the supporter abuts the stiffening ribs on the rear wall of the tub, wherein a rear portion of the bearing housing protrudes from the rear wall of the tub and is exposed, and wherein an inner circumferential surface of the supporter abuts the exposed rear portion of the bearing housing.

50. The washing machine of claim 49, wherein a front portion of the bearing housing is inserted injection molded into the rear wall of the tub.

51. A washing machine, comprising:
an outer tub formed of a molded material and configured to hold washing water, the tub including a rear wall and an integrally molded sidewall, wherein stiffening ribs are integrally formed in the rear wall of the tub;
a bearing housing that is mounted on the rear wall of the tub;
at least one bearing mounted in the bearing housing;
a drum rotatably mounted inside the outer tub;
a shaft coupled to the drum and mounted in the at least one bearing in the bearing housing;
a motor coupled to the outer side of the rear wall of the tub and to the shaft, wherein the motor comprises:
   a stator coupled to the outer side of the rear wall of the tub, and
   a rotor coupled to the shaft and having a rear wall and a side wall that surrounds the stator; and
a rigid supporter mounted between the rear wall of the tub and the stator, wherein the supporter abuts the stiffening ribs on the rear wall of the tub, and wherein the supporter is generally conical in shape with the central portion of the supporter sloping away from the inside of the tub.

52. The washing machine of claim 51, wherein a series of flat steps are formed on the generally conically shaped supporter.

* * * * *